US012071766B2

(12) United States Patent
Jackson

(10) Patent No.: US 12,071,766 B2
(45) **Date of Patent: *Aug. 27, 2024**

(54) LOUVERED PATIO COVER CONTROL SYSTEM

(71) Applicant: JACKSON DESIGN & REMODELING, INC., San Diego, CA (US)

(72) Inventor: Todd Raymond Jackson, San Diego, CA (US)

(73) Assignee: JACKSON DESIGN & REMODELING, INC., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,009

(22) Filed: Jun. 20, 2023

(65) Prior Publication Data

US 2023/0332412 A1 Oct. 19, 2023

Related U.S. Application Data

(63) Continuation of application No. 17/245,733, filed on Apr. 30, 2021, now Pat. No. 11,725,390.

(51) Int. Cl.

| | |
|---|---|
| ***E04F 10/10*** | (2006.01) |
| ***F21V 23/04*** | (2006.01) |
| ***G08C 17/02*** | (2006.01) |
| *F21W 131/10* | (2006.01) |

(52) U.S. Cl.

CPC ............ *E04F 10/10* (2013.01); *F21V 23/045* (2013.01); *G08C 17/02* (2013.01); *F21W 2131/10* (2013.01)

(58) Field of Classification Search

CPC ........ E04F 10/10; F21V 23/045; G08C 17/02; E04B 7/163; E04B 7/166; F21W 2131/10

See application file for complete search history.

(56) References Cited

U.S. PATENT DOCUMENTS

| | | | | |
|---|---|---|---|---|
| 3,204,090 A * | 8/1965 | Kvarda, Jr. | ............... | F21S 4/20 362/249.01 |
| 3,748,461 A * | 7/1973 | Wilson | .................. | F21V 17/101 362/311.01 |
| 4,527,355 A * | 7/1985 | Numakami | ............. | E04F 10/10 49/90.1 |

(Continued)

*Primary Examiner* — Beth A Stephan

(74) *Attorney, Agent, or Firm* — PILLSBURY WINTHROP SHAW PITTMAN LLP; Peter K. Hahn; Jeffrey T. Sheriff

(57) ABSTRACT

This disclosure relates to a patio cover control system. The system comprises a frame comprising support beams, support posts configured to support the frame, cover panels rotatably coupled to the support beams, an actuator mounted to the frame and coupled to the cover panels, a gutter coupled to the frame, a light source coupled to the gutter, a precipitation sensor, a fan, and/or a portable controller wirelessly coupled to the actuator, the light source, the precipitation sensor, and/or the fan. The actuator may be configured to rotate the cover panels between an open configuration and a closed configuration. The light source may be configured to light an area under the cover panels. The portable controller may be configured to control the actuator, the light source, the precipitation sensor, the fan, and/or other components.

20 Claims, 5 Drawing Sheets

(56) References Cited

U.S. PATENT DOCUMENTS 4,837,986 A * 6/1989 Gagne ................. E04D 13/0351 52/72
5,669,709 A * 9/1997 Adams .................... F21V 21/08 362/396
6,363,662 B1 * 4/2002 Coates ....................... F21S 4/10 52/12
6,536,165 B2 * 3/2003 Pilcher .................. E04D 13/064 52/12
6,572,239 B1 * 6/2003 Harbin .................... F21V 15/01 362/248
6,644,836 B1 * 11/2003 Adams .................... F21V 21/08 362/147
6,652,112 B1 * 11/2003 Lucarelli ................. F21V 21/08 362/396
6,918,680 B2 * 7/2005 Seeberger ............... F21S 8/028 362/427
6,955,458 B2 * 10/2005 Cheema .................... F21S 4/20 362/249.06
7,114,389 B1 * 10/2006 Mouridsen .............. E05F 15/71 73/170.17
7,344,265 B1 * 3/2008 Tieken .................. F21V 33/006 362/240
8,152,112 B2 * 4/2012 Miller ....................... F21S 4/20 52/12
8,926,118 B1 * 1/2015 Whittaker ................. F21S 8/00 362/240
8,956,000 B2 * 2/2015 Martinez ............... F21V 33/006 362/151
9,103,535 B1 * 8/2015 Strobel ................. F21V 33/006
9,222,693 B2 * 12/2015 Gourlay ................. G05B 15/02
9,422,715 B1 * 8/2016 Selzer ..................... E04D 11/00
10,000,926 B1 * 6/2018 Morfin ...................... E04D 5/00
10,094,138 B2 * 10/2018 Gharabegian ....... H04L 12/4625
10,260,737 B2 * 4/2019 McGuire ............... E04D 13/064
10,565,631 B2 * 2/2020 Gharabegian ........ A45B 25/165
10,677,484 B2 * 6/2020 Ribbich ............. G05D 23/1934
10,932,535 B2 * 3/2021 Du ......................... A45B 23/00
10,938,337 B1 * 3/2021 Carleton ............... E04B 1/3445
10,988,926 B2 * 4/2021 Mitchell ................. E04B 7/163
11,015,349 B2 * 5/2021 Byszenski ............... E04F 10/10
11,149,438 B2 * 10/2021 Torman ................... E04F 10/10
11,168,481 B2 * 11/2021 Rieber .................. E04B 1/0046
11,286,664 B2 * 3/2022 Ayars ...................... E04B 7/163
11,326,349 B2 * 5/2022 Jackson .............. E04D 13/0325
11,347,754 B1 * 5/2022 Ho ........................ G06F 16/906
11,725,390 B2 * 8/2023 Jackson .................. E04F 10/10 160/62
2002/0129565 A1 * 9/2002 Silberman ................. E04H 3/14 52/66
2003/0198054 A1 * 10/2003 Adams .................... F21V 21/08 362/396
2005/0225982 A1 * 10/2005 Hahn .................... F21V 7/0016 362/249.16
2011/0090676 A1 * 4/2011 Sortor ..................... F21V 17/16 362/232
2013/0291438 A1 * 11/2013 Selzer ..................... E04B 7/163 49/82.1
2014/0175240 A1 * 6/2014 Selzer ..................... E04B 7/163 49/82.1
2016/0047516 A1 * 2/2016 Taylor ..................... F21V 21/02 362/368
2016/0338457 A1 * 11/2016 Gharabegian ............. G01J 1/42
2018/0332154 A1 * 11/2018 Gharabegian ........... H02S 20/32
2021/0214942 A1 * 7/2021 Lacas ........................ A01G 9/28
2021/0277660 A1 * 9/2021 Zveibil ................. E04F 10/005
2021/0363752 A1 * 11/2021 Wagaman ............... E04F 10/10

* cited by examiner

LOUVERED PATIO COVER CONTROL SYSTEM

CROSS-REFERENCE

This present application is a continuation of U.S. patent application Ser. No. 17/245,733, filed Apr. 30, 2021, entitled "LOUVERED PATIO COVER CONTROL SYSTEM," which is being incorporated hereby by reference.

FIELD OF THE DISCLOSURE

This disclosure relates to a louvered patio cover control system.

BACKGROUND

Louvered patio covers are known. Louvered patio covers are often installed over an area designed for seating, tables, and/or other objects, to create an outdoor living space. Louvered patio covers are designed to be aesthetically pleasing, and function as at least a partial shelter from the ambient environment. Typical louvered patio covers do not include a portable controller configured to control movement of louvered panels, louvered patio cover lighting, a fan, or other components of a louvered patio cover.

SUMMARY

One aspect of the disclosure relates to a patio cover control system. The system may comprise a frame, support posts, cover panels, an actuator, a gutter, a light source, a portable controller, and/or other components. The frame may comprise support beams. The support posts may be configured to support the frame. The cover panels may be rotatably coupled to the support beams. The actuator may be mounted to the frame and coupled to the cover panels. The actuator may be configured to rotate the cover panels between an open configuration and a closed configuration. The gutter may be coupled to the frame. The light source may be coupled to the gutter, the frame, and/or other components. The light source may be configured to light an area under the cover panels. In some implementations, the portable controller may be configured to control the actuator and at least one other electrical component of the patio cover system. For example, the portable controller may be wirelessly coupled to the actuator and the light source. The portable controller may be configured to control the actuator to rotate the cover panels between the open configuration and the closed configuration, control the light source to light the area under the cover panels, and/or perform other functions.

In some implementations, the cover panels may be louvered.

In some implementations, the portable controller may be hand held.

In some implementations, the portable controller may be a remote control.

In some implementations, the portable controller may comprise an electronic application executed by a computing device associated with a user. The computing device may be a smart phone or a tablet computer, for example.

In some implementations, the at least one other electrical component of the patio cover comprises the light source. Controlling the light source to light the area under the cover panels may comprise (1) turning the light source on or off, (2) adjusting an intensity of light produced by the light source, (3) adjusting a color of the light produced by the light source, and/or other operations.

In some implementations, controlling the actuator to rotate the cover panels between the open configuration and the closed configuration may comprise (1) turning the actuator on or off, (2) causing the actuator to rotate the cover panels between the open configuration and the closed configuration, (3) causing the actuator to stop rotation of the cover panels at an intermediate configuration between the open configuration and the closed configuration, and/or other operations.

In some implementations, the at least one other electrical component of the patio cover comprises a precipitation sensor operatively coupled to the actuator and the portable controller. The precipitation sensor may be configured to generate output signals indicating a presence of precipitation on the frame and/or the cover panels. In some implementations, the actuator may be configured to, responsive to the output signals indicating the presence of precipitation, rotate the cover panels to the closed configuration. In some implementations, the precipitation sensor may be configured to generate output signals indicating the presence of precipitation responsive to a quantity of precipitation breaching a threshold precipitation level. In some implementations, the portable controller may be configured to receive entry or selection of the threshold precipitation level from a user. In some implementations, the actuator may be configured to, responsive to the output signals indicating a lack of precipitation, or a ceasing of precipitation, rotate the cover panels to the open configuration, or an intermediate configuration between the closed configuration and the open configuration.

In some implementations, the at least one other electrical component of the patio cover comprises a fan mounted to the frame or a support post. The fan may be operatively coupled to the portable controller. In some implementations, the portable controller may be configured to control a speed and/or direction of fan rotation.

Another aspect of the disclosure relates to a method for controlling a patio cover system. The patio cover system may comprise a frame, support posts, cover panels, an actuator, a gutter, a light source, a portable controller, and/or other components. The frame may comprise support beams. The support posts may be configured to support the frame. The cover panels may be rotatably coupled to the support beams. The actuator may be mounted to the frame and coupled to the cover panels. The actuator may be configured to rotate the cover panels between an open configuration and a closed configuration. The gutter may be coupled to the frame. The light source may be coupled to the gutter. The light source may be configured to light an area under the cover panels. In some implementations, the portable controller may be configured to control the actuator and at least one other electrical component of the patio cover system. For example, the portable controller may be wirelessly coupled to the actuator and the light source. The method may comprise remotely controlling, with the portable controller, the actuator to rotate the cover panels between the open configuration and the closed configuration; and remotely controlling, with the portable controller, the light source to light the area under the cover panels.

In some implementations, the portable controller may comprise an electronic application executed by a computing device associated with a user. The computing device may be a smart phone or a tablet computer, for example.

In some implementations, the at least one other electrical component of the patio cover comprises the light source.

Controlling the light source to light the area under the cover panels may comprise (1) turning the light source on or off, (2) adjusting an intensity of light produced by the light source, (3) adjusting a color of the light produced by the light source, and/or other operations.

In some implementations, controlling the actuator to rotate the cover panels between the open configuration and the closed configuration comprises (1) turning the actuator on or off, (2) causing the actuator to rotate the cover panels between the open configuration and the closed configuration, (3) causing the actuator to stop rotation of the cover panels at an intermediate configuration between the open configuration and the closed configuration, and/or other operations.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1A:
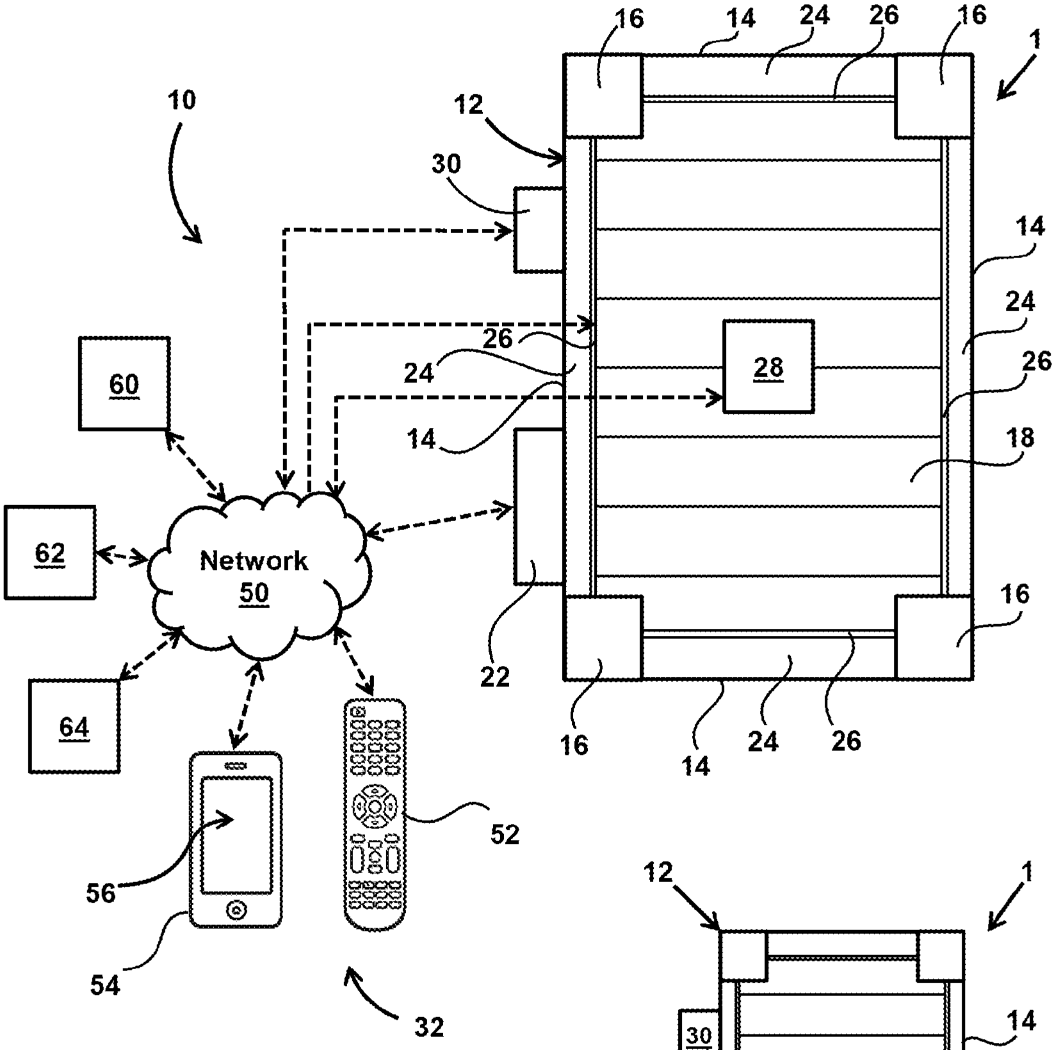
FIG. 1A illustrates a patio cover control system, in accordance with one or more implementations.

In the following paragraphs, implementations of the present disclosure will be described in detail by way of example with reference to the accompanying drawings, which are not necessarily drawn to scale, and the illustrated components are not necessarily drawn proportionately to one another. Throughout this description, the implementations and examples shown should be considered as exemplars, rather than as limitations on the present disclosure. As used herein, the "present disclosure" refers to any one of the implementations of the disclosure described herein, and any equivalents. Furthermore, reference to various aspects of the disclosure throughout this document does not mean that all claimed implementations or methods must include the referenced aspects.

As used herein, the singular form of "a", "an", and "the" include plural references unless the context clearly dictates otherwise. As used herein, the statement that two or more parts or components are "coupled" shall mean that the parts are joined or operate together either directly or indirectly, i.e., through one or more intermediate parts or components, so long as a link occurs. As used herein, "directly coupled" means that two elements are directly in contact with each other. As used herein, "fixedly coupled" or "fixed" means that two components are coupled so as to move as one while maintaining a constant orientation relative to each other.

As employed herein, the statement that two or more parts or components "engage" one another shall mean that the parts exert a force against one another either directly or through one or more intermediate parts or components. Directional phrases used herein, such as, for example and without limitation, top, bottom, left, right, upper, lower, front, back, above, below, and derivatives thereof, relate to the orientation of the elements shown in the drawings and are not limiting upon the claims unless expressly recited therein.

FIG. 1A illustrates a patio cover control system 10. System 10 may comprise a frame 12 (e.g., a top view of frame 12 is shown in FIG. 1A), support beams 14, support posts 16, cover panels 18, an actuator 22, a gutter 24, a light source 26, a fan 28, a precipitation sensor 30, a portable controller 32, a network 50, and/or other components. In some implementations, frame 12, support beams 14, support posts 16, cover panels 18, actuator 22, gutter 24, light source 26, fan 28, precipitation sensor 30, and/or other components may be included in or form a patio cover 1. Patio cover 1 may be similar to and/or the same as the patio cover described in U.S. patent application Ser. No. 16/74,707, filed 15 Jan. 2020, and titled "Louvered Patio Cover", which is incorporated by reference herein in its entirety. It should be noted that patio cover 1 may also include additional components not illustrated in FIG. 1A, but nonetheless advantageous to include in such a system. These components may include, for example, a heater, a wind sensor, roller shades, and/or other components.

Advantageously, portable controller 32 may be wirelessly coupled to actuator 22, light source 26, fan 28, precipitation sensor 30, network 50, a heater, a wind sensor, a roller shade, and/or other components of system 10. This may provide a convenient, centralized, portable control of multiple components of patio cover system 10 for users. This contrasts with prior patio covers, which, at best, may include individual portable controllers for each of these components (if such controllers are provided at all), but do not provide the centralized convenience of portable controller 32.

Portable controller 32 may be configured to control actuator 22, light source 26, fan 28, precipitation sensor 30, network 50, a heater, a wind sensor, a roller shade, and/or other components of system 10. In some implementations, portable controller 32 may be configured to control actuator 22 and at least one other electrical component of system 10. This may include, for example, controlling actuator 22 to rotate cover panels 18 between an open configuration and a closed configuration, controlling light source 26 to light the area under or around cover panels 18 and/or frame 12, controlling fan 28 to turn off or on and/or change speeds, and/or other control. In some implementations, portable controller 32 comprises a remote 52, a computing device 54 configured to execute an electronic application (app) 56, and/or other controllers. In some implementations, system 10 may include remote 52 and computing device 54/app 56. In some implementations, system 10 may include remote 52 or computing device 54/app 56. Portable controller 32 may be configured to communicate with one or more other components of the system wirelessly and/or via wires. For example, portable controller 32 may be configured to communicate via infrared signals, radio frequency (RF) signals, WiFi, Bluetooth, and/or via other mechanisms. In some implementations, portable controller 32 may be configured to communicate with and/or through an associated whole home automation system. For example, portable controller may be configured to communicate with and/or through a whole home automation system such that portable controller 32 may be used to control other household devices (e.g., lights, door locks, air conditioning, heating, garage doors, etc.). As another example, commands for controlling one or more patio cover components entered and/or selected by a user via portable controller 32 may be communicated to the patio cover components through the whole home automation system. This may facilitate situations, for example, where a user is inside the user's home, away from the patio cover, but still able to control components of the patio cover, even though the user would normally have been out of range for such communication.

Remote 52 may be operatively coupled to one or more of actuator 22, light source 26, fan 28, precipitation sensor 30, network 50, a heater, a wind sensor, and/or other components of system 10. Remote 52 may be configured to provide an interface between actuator 22, light source 26, fan 28, precipitation sensor 30, network 50, a heater, a wind sensor, a roller shade, and/or other components and a user through which the user may provide entry and/or selection of control commands for one or more of the components of system 10. This enables user control of one or more of actuator 22, light source 26, fan 28, precipitation sensor 30, network 50, a heater, a wind sensor, a roller shade, and/or other components of system 10. Remote 52 may include a keypad, buttons, switches, a keyboard, knobs, levers, a display screen, a touch screen, speakers, a microphone, an indicator light, an audible alarm, a tactile feedback device, and/or other interface devices. Remote 52 may include one or more of these components in a housing, for example. In some implementations, remote 52 may be sized so that it may be hand held, and/or have other sizes.

Figure 1B:
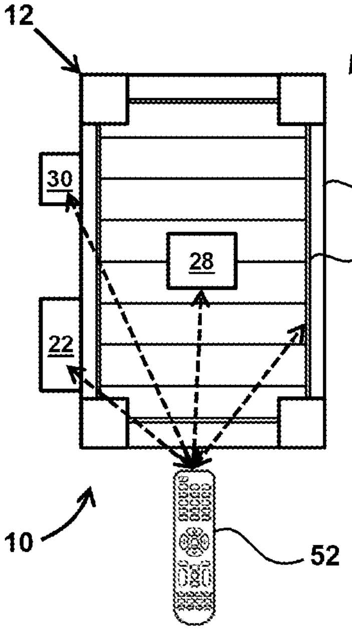
FIG. 1B illustrates an implementation of the system that does not include a network, in accordance with one or more implementations.

In some implementations, as shown in FIG. 1B, remote 52 may be configured to operatively couple with actuator 22, light source 26, fan 28, precipitation sensor 30, a heater, a wind sensor, a roller shade, and/or other components of system 10 without network 50. The operative coupling may be wireless, for example. In these implementations, the user may provide entry and/or selection of control commands for one or more of the components of system 10, and the control commands may be transmitted by remote 52 directly from remote 52 to one or more of these components. The commands may be transmitted by remote 52 using, for example, infrared light and/or other command transmission mechanisms. Actuator 22, light source 26, fan 28, precipitation sensor 30, a heater, a wind sensor, a roller shade, etc., may include components configured to receive these light based commands.

Returning to FIG. 1A, computing device 54 may be operatively coupled to one or more of actuator 22, light source 26, fan 28, precipitation sensor 30, network 50, a heater, a wind sensor, a roller shade, and/or other components of system 10. Computing device 54 may be associated with a user. For example, computing device 54 may be a smart phone, a tablet computer, and/or other computing devices associated with a user. As shown in FIG. 1A, computing device 54 may be configured such that a user may control and/or otherwise access components of system 10 such as actuator 22, light source 26, fan 28, precipitation sensor 30, network 50, a heater, a wind sensor, a roller shade, and/or other components of system 10, via user computing device 54.

In some implementations, user computing device 54 may be configured to communicate with a server 60, other user devices 54, actuator 22, light source 26, fan 28, precipitation sensor 30, network 50, a heater, a wind sensor, a roller shade, and/or other components of system 10, and/or other components, according to a peer-to-peer architecture, a client/server architecture, and/or other architectures. User computing device 54 may include communication lines, or ports to enable the exchange of information with network 50, other computing platforms (e.g., one or more other user devices 54, server 60), actuator 22, light source 26, fan 28, precipitation sensor 30, network 50, a heater, a wind sensor, a roller shade, and/or other components of system 10, and/or other devices. In some implementations, communication between user computing device 54 and other components of system 10 may be wireless and/or via wires. For example, user computing device 54 may communicate with actuator 22, light source 26, fan 28, precipitation sensor 30, server 60, and/or other components of system 10 wirelessly via network 50. Network 50 may include the internet, a Wi-Fi network, Bluetooth® technology, and/or other wireless technology. By way of non-limiting example, user computing device 54 may include a laptop computer, a handheld computer, a tablet computing platform, a NetBook, a smartphone, and/or other computing platforms.

In some implementations, computing device 54 may include a user interface and/or other components. The user interface may be configured to provide an interface between system 10 and a user through which the user may provide information to and receive information from (e.g., control) system 10. This enables data, cues, results, and/or instructions and any other communicable items, collectively referred to as "information," to be communicated between a user and one or more of actuator 22, light source 26, fan 28, precipitation sensor 30, network 50, server 60, a heater, a wind sensor, a roller shade, and/or other components of system 10.

Examples of interface devices suitable for inclusion in the user interface comprise a keypad, buttons, switches, a keyboard, knobs, levers, a display screen, a touch screen, speakers, a microphone, an indicator light, an audible alarm, a printer, a tactile feedback device, and/or other interface devices. It is to be understood that other communication techniques, either hard-wired or wireless, are also contemplated by the present disclosure as the user interface. For example, the present disclosure contemplates using an RS-232 port, an RF link, an IR link, a USB port and/or cable, a modem (telephone, cable or other), and/or other communication techniques. In short, any technique for communicating information with system 10 is contemplated by the present disclosure as the user interface.

In some implementations, the user interface of computing device 54 may be and/or include a graphical user interface that is presented to a user on computing device 54 (e.g., a smartphone and/or other computing device associated with the user). The graphical user interface may include a web-based interface including data fields for receiving inputs from a user and/or providing electronic information to a user. The graphical user interface may be implemented in whole and/or in part using technologies such as HTML, Flash, Java, .net, web services, and/or RSS, for example. In some implementations, the user interface may comprise one or more views of app 56 that facilitate entry and/or selection of control information to system 10, and/or presenting control information to a user. The control information may comprise instructions to open or close (or partially open or close) panels 18, an indication of a current position of panels 18, instructions for turning fan 28 on or off, instructions for adjusting a speed and/or direction of fan 28, current fan 28 speed and/or direction settings, instructions for turning light source 26 on or off, instructions for adjusting a color or intensity of light provided by light source 26, current light source 26 settings, instructions for adjusting precipitation threshold set points for precipitation sensor 30, instructions for adjusting wind threshold set points for a wind sensor, current heater set points, instructions for moving a roller shade up or down, and/or other control information. In some implementations, the graphical user interface may be configured to display information in addition to and/or instead of control information. Such information may include, for example, indicators for malfunctioning equipment, a link to request service on the system, the day's weather, and/or other information.

Figure 2:
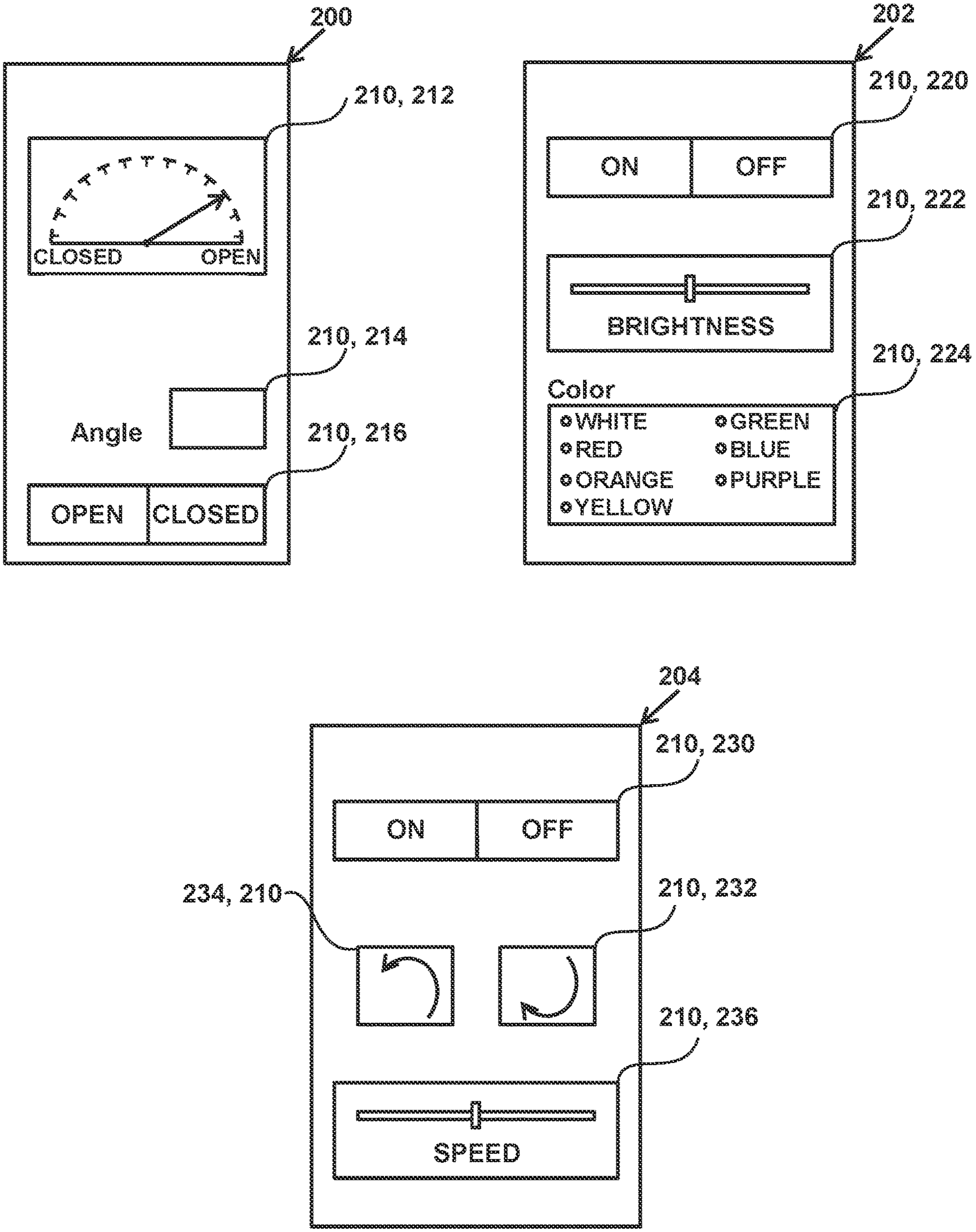
FIG. 2 illustrates possible views of a graphical user interface configured to facilitate entry and/or selection of control information for the system, in accordance with one or more implementations.

By way of a non-limiting example, FIG. 2 illustrates possible views 200, 202, 204 of a graphical user interface configured to facilitate entry and/or selection of control information to system 10 (FIG. 1A), and/or presenting control information to a user. Views 200-204 and/or other views may be presented by app 56 (FIG. 1A) running on computing device 54 (FIG. 1A), for example. In some implementations, facilitating entry and/or selection of control information, and/or presenting control information, may include causing one or more fields 210 to be presented to the user in one or more views 200-204. In this example, view 200 illustrates fields 210 for adjusting the angle of panels 18 (FIG. 1A) (e.g., by way of a dial field 212, an angle entry field 214) and opening or closing panels 18 (via open/closed buttons in field 216). View 202 illustrates fields 210 for turning light source 26 (FIG. 1A) on or off (via the on and off buttons in field 220), adjusting the brightness of light source 26 (via slider field 222), and changing the color of the light from light source 26 (via color button filed 224). View 204 illustrates fields 210 for turning fan 28 (FIG. 1A) on or off (via the on and off buttons in field 230), changing a direction of fan rotation (via the directional buttons in fields 232 and 234), and adjusting a fan speed (via the speed slider in field 236). These are examples only, and are not intended to be limiting.

Returning to FIG. 1A, panels 18 may be configured to block or reduce an amount of ambient light that passes through frame 12 into an interior of patio cover 1. Panels 18 may be louvered and/or have other configurations. Panels 18 may be configured to at least partially block elements (e.g., light, precipitation, wind, etc.) of the ambient environment from reaching the interior of patio cover 1. Panels 18 may be opaque, translucent, and/or transparent. Panels 18 may be formed from polymers, wood, metal, and/or other materials. Individual panels 18 may be configured to be suspended in parallel between support beams 14 across frame 12, above the interior of patio cover 1. Panels 18 may be rotatably coupled to support beams 14 so that panels 18 may rotate relative to support beams 14. In some implementations, panels 18 may have an elongated, generally rectangular shape, and/or other shapes. Panels 18 may be rotatably coupled to support beams 14 at either and/or both ends of a given panel 18. Patio cover 1 may be configured with any number of panels 18, having any dimensions that allow patio cover 1 to function as described herein.

Actuator 22 may be configured to rotate cover panels 18 between an open configuration and a closed configuration. Actuator 22 may be mounted to frame 12 and coupled to panels 18. Actuator 22 may be mounted to frame 12 in any location that facilitates coupling with louvered panels 18. In some implementations, actuator 22 may be coupled to panels 18 via one or more actuator arms and/or other components, for example. Actuator 22 may include one or more actuator arms, a motor, and/or other components. In some implementations, one or more actuator arms may include rotating joints, bearings, hinges, and/or other components that facilitate coupling actuator 22 to panels 18 and/or movement of panels 18 by actuator 22. Actuator 22 may be configured to rotate panels 18 between an open configuration and a closed configuration, and/or intermediate configurations between the open configuration and the closed configuration. Actuator 22 may be configured such that the open configuration allows ambient light (and/or other elements of the ambient environment) to pass between panels 18, and the closed configuration blocks light (and/or the other elements of the ambient environment) from passing between panels 18. In some implementations, actuator 22 may be configured to rotate individual panels 18 in unison between the open configuration and the closed configuration.

As described above, portable controller 32 may be configured to control actuator 22. Portable controller 32 may be configured to control actuator 22 to move panels between an open configuration and a closed configuration. In some implementations, controlling actuator 22 to rotate cover panels 18 between the open configuration and the closed configuration comprises one or more of (1) turning actuator 22 on or off, (2) causing actuator 22 to rotate cover panels 18 between the open configuration and the closed configuration, (3) causing actuator 22 to stop rotation of cover panels 18 at an intermediate configuration between the open configuration and the closed configuration, and/or other operations. For example, a user may enter and/or select control information (as described above) via one or more fields in one or more views of a graphical user interface to control actuator 22 (e.g., as shown in view 200 of FIG. 2). Similar control may be exercised using remote 52, for example.

A gutter 24 may be coupled to support beams 14, support posts 16, and/or other components of frame 12 and/or patio cover 1. Gutter 24 may be coupled via various screws, nuts, bolts, clips, clamps, adhesive, and/or other coupling mechanisms. In some implementations, gutters 24 may be formed from metal, polymers, wood, and/or other materials. For example, gutters 24 may be formed from one or pieces of sheet metal and/or other materials. In some implementations, gutters 24 may be formed from one or more relatively thin pieces of sheet metal, bent and/or heat treated into specific shapes, extruded into a specific shape, and/or formed with other operations. Gutters 24 may be coupled to frame 12 and/or patio cover 1 on interior surfaces of support beams 14 and/or in other locations. Gutters 24 may be configured to receive and channel water away from an interior of patio cover 1 and/or perform other functions.

A gutter 24 may comprise one or more surfaces configured to be coupled with a support beam 14, an interior portion configured to receive and channel the water, one or more lighting channels, and/or other components. Gutter 24 may be configured to hold a light source 26 in the one or more lighting channels for lighting an area under, within, and/or around patio cover 1. In some implementations, gutter 24 may comprise one, two, or more lighting channels.

In some implementations, a lighting channel may open toward an interior of gutter 24, for example. In some implementations, the interior may be configured to reflect and/or otherwise scatter light from light source 26 to enhance the light provided by light source 26. In some implementations, gutter 24 may comprise two lighting channels, with one lighting channel opening toward the interior of gutter 24, and a second lighting channel opening toward a ground surface below patio cover 1 when gutter 24 is coupled to frame 12. In some implementations, light source 26 may be coupled to beams 14 and/or posts 16, without a need for gutter 24.

Light source 26 may be configured to light an area under, within, and/or around patio cover 1. Light source 26 may be configured to provide light of different intensities (brightness), different colors, and/or other characteristics. In some implementations, light source 26 may be configured to removably couple with gutter 24 and/or other components of system 10. In some implementations, light source 26 may be and/or include a light emitting diode (LED) and/or other light sources.

As described above, portable controller 32 may be configured to control light source 26. Portable controller 32 may be configured to control light source 26 to light the area under, within, and/or around patio cover 1. Controlling light source 26 to light the area under, within, and/or around patio cover 1 (e.g., including cover panels 18) may comprise one or more of (1) turning the light source on or off, (2) adjusting an intensity of light produced by the light source, (3) adjusting a color of the light produced by the light source, and/or other operations. For example, a user may enter and/or select control information (as described above) via one or more fields in one or more views of a graphical user interface to control light source 26 (e.g., as shown in view 202 of FIG. 2). Similar control may be exercised using remote 52, for example.

Fan 28 may be configured to move air in, around, or through patio cover 1. Fan 28 may be mounted to frame 12, a support post 16 and/or other components of system 10. Fan 28 may be operatively coupled to portable controller 32 and/or other components of system 10. Fan 28 may be configured to operate at different rotational speeds and/or in different rotational directions. Fan 28 may be controlled by portable controller 32. Portable controller 32 may be used to turn fan 28 on or off, adjust the rotational speed of fan 28, adjust the rotational direction of fan 28, and/or perform other control operations. For example, a user may enter and/or select control information (as described above) via one or more fields in one or more views of a graphical user interface to control fan 28 (e.g., as shown in view 204 of FIG. 2). Similar control may be exercised using remote 52, for example.

A heater may be configured to heat air in or around patio cover 1. The heater may be mounted to frame 12, a support post 16 and/or other components of system 10. The heater may be operatively coupled to portable controller 32 and/or other components of system 10. The heater may be configured to operate at different heating levels. The heater may be controlled by portable controller 32. Portable controller 32 may be used to turn the heater on or off, adjust the heating level, and/or perform other control operations. For example, a user may enter and/or select control information (as described above) via one or more fields in one or more views of a graphical user interface to control the heater. Similar control may be exercised using remote 52, for example.

Precipitation sensor 30 may be configured to generate output signals indicating a presence of precipitation on frame 12, cover panels 18, and/or other components of system 10. Precipitation may include rain, snow, and/or other precipitation. In some implementations, precipitation sensor 30 may be configured to generate output signals indicating an intensity of ambient radiation (e.g., sunlight) and/or other information. Precipitation sensor 30 may be operatively coupled to actuator 22, portable controller 32, and/or components of system 10. In some implementations, actuator 22 may be configured to, responsive to the output signals indicating the presence of precipitation (or relatively intense ambient radiation), rotate cover panels 18 (and/or a roller shade, for example) to the closed configuration. In some implementations, actuator 22 may be configured to, responsive to the output signals indicating a lack of precipitation or a ceasing of precipitation (or relatively less intense ambient radiation), rotate cover panels 18 (and/or a roller shade) to the open configuration, or an intermediate configuration between the closed configuration and the open configuration.

In some implementations, precipitation sensor 30 may be configured to generate output signals indicating the presence of precipitation (and/or intense radiation) responsive to a quantity of precipitation (or intensity of radiation) breaching a threshold precipitation (or radiation) level. In some implementations, portable controller 32 may be configured to receive entry or selection of the threshold precipitation (or radiation intensity) level from a user (e.g., via one or more fields 210 of one or more views 200-204 of the graphical user interface shown in FIG. 2). In some implementations, precipitation sensor 30 may be configured to, after a predetermined period of time without precipitation, signal actuator 22 to rotate cover panels 18 (and/or a roller shade) back to an open position.

A wind sensor may be configured to generate output signals indicating a presence of wind on frame 12, cover panels 18, and/or other components of system 10. In some implementations, the wind sensor may be configured to generate output signals indicating an intensity of wind (e.g., a wind speed) and/or other information. The wind sensor may be operatively coupled to actuator 22, portable controller 32, a roller shade, and/or components of system 10. In some implementations, actuator 22 may be configured to, responsive to the output signals indicating the presence of wind (or relatively intense wind that breaches a specific wind speed threshold level), rotate cover panels 18 (and/or a roller shade) to a specific configuration (e.g., a more aerodynamic configuration).

Figure 3:
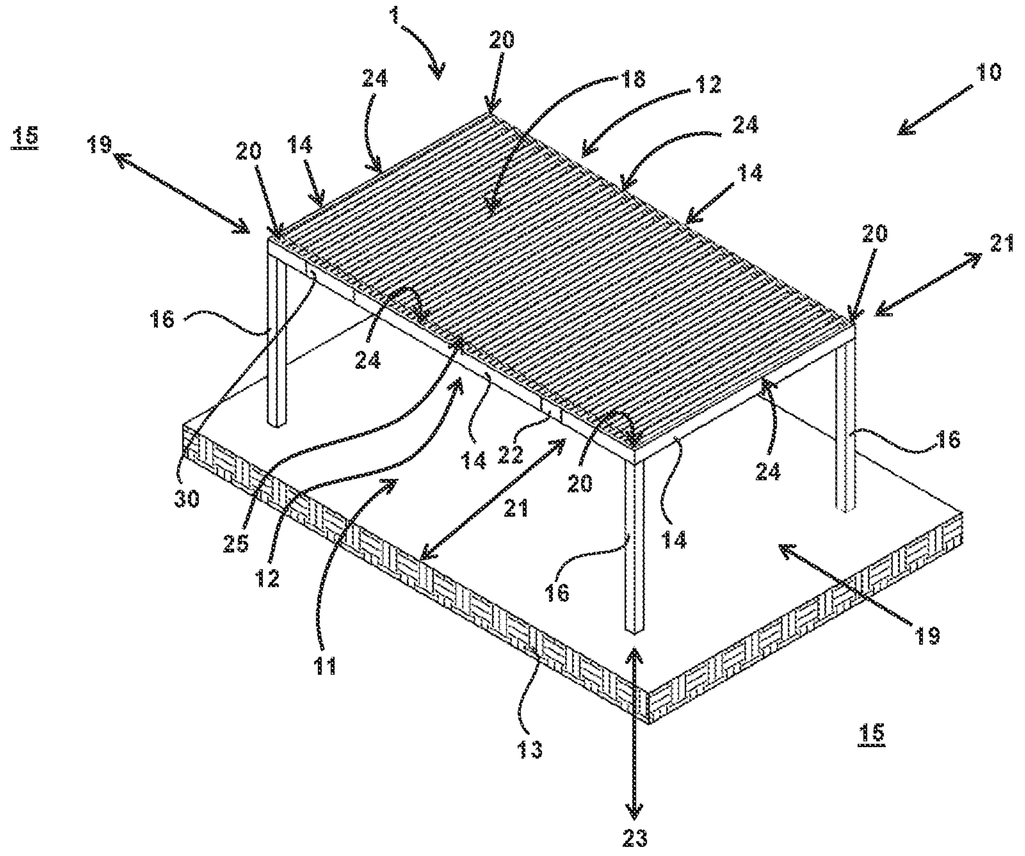
FIG. 3 illustrates a perspective view of a patio cover and other components of the system, in accordance with one or more implementations.

FIG. 3 illustrates a perspective view of patio cover 1 and other components of system 10. Patio cover 1 is illustrated installed over an area 11 designed for seating, tables, and/or other objects, to create an outdoor living space. In the example shown in FIG. 3, patio cover 1 is shown installed over a patio 13. Patio 13 may be formed from cement and/or concrete, wood, earth, grass, gravel, and/or other materials. Patio cover 1 may be configured to be aesthetically pleasing, and function as at least a partial shelter from the ambient environment 15. In some implementations, patio cover 1 may comprise frame 12 with support beams 14, support posts 16, panels 18, and/or other components.

Frame 12 may be and/or form a support structure for panels 18, actuator 22, fan 28 (FIGS. 1A and 1B), sensor 30, and/or other components of system 10. In some implementations, frame 12 may form a perimeter of patio cover 1. Frame 12 may have a generally rectangular shape (e.g., as shown in FIG. 3) and/or other shapes. Frame 12 may be formed by a plurality of support beams 14 and/or other components. Frame 12 may be formed by coupling the ends of support beams 14 together. For example, as shown in FIG. 3, four support beams 14 may be coupled together to form the generally rectangular shape of frame 12. Continuing with this example, an individual support beam 14 may be coupled to two other support beams 14, one at either end of the individual support beam 14. Frames 12 having other quantities of support beams 14 joined to form the same (e.g., generally rectangular) or other frame 12 shapes (e.g. generally square, triangular, pentagonal, hexagonal, octagonal, etc.) are contemplated.

As described above, support beams 14 may be coupled together to form frame 12 and/or be used for other purposes. In some implementations, support beams 14 may have a length that extends along a primary longitudinal axis 19 or 21 and a thickness that extends along a secondary transverse axis (not specifically labeled in FIG. 3). In some implementations (e.g., when frame 12 has a generally rectangular shape), pairs of support beams 14 may have substantially the same length, with a first pair having a length that is longer than a length of a second pair of support beams 14. These pairs of support beams 14 may be coupled to form a rectangle (e.g., as illustrated in FIG. 3), with beams of the same length on opposite sides of the rectangle. In some implementations (e.g., when frame 12 has a generally square and/or other shapes), support beams 14 may have the same length. In some implementations, support beams 14 may have a rectangular cross section and/or other cross sections. In some implementations, support beams 14 may be solid or hollow. In some implementations, support beams 14 may be partially hollow. For example, support beams 14 may have hollow ends and/or other hollow areas. In some implementations, support beams 14 may be formed from metal, wood, and/or other materials.

Support posts 16 may be configured to support frame 12 and/or other components. Support posts 16 may be vertically oriented, for example, and/or have other orientations. Support posts 16 may be fixedly or movably coupled to a patio 13, a ground surface, and/or any other support surface. In some implementations, support posts 16 may rest on patio 13, a ground surface, or another support surface without being fixedly or movably coupled to such a surface. In some implementations, support posts 16 may have a length that extends along a primary longitudinal axis 23 and a thickness that extends along a secondary transverse axis (not specifically labeled in FIG. 3). In some implementations (e.g., when frame 12 has a generally rectangular shape), support posts 16 may include four support posts 16 having substantially the same length. Support posts 16 may be positioned at or near the corners of the generally rectangular shape formed by frame 12 (e.g., as illustrated in FIG. 3). In some implementations (e.g., when frame 12 has a generally triangular and/or other shapes), more or less support posts 16 may be required. In some implementations, support posts 16 may have a generally square cross section, rectangular cross section, and/or other cross sections. In some implementations, support posts 16 may be solid or hollow. In some implementations, support posts 16 may be formed from metal, wood, and/or other materials.

Figure 4:
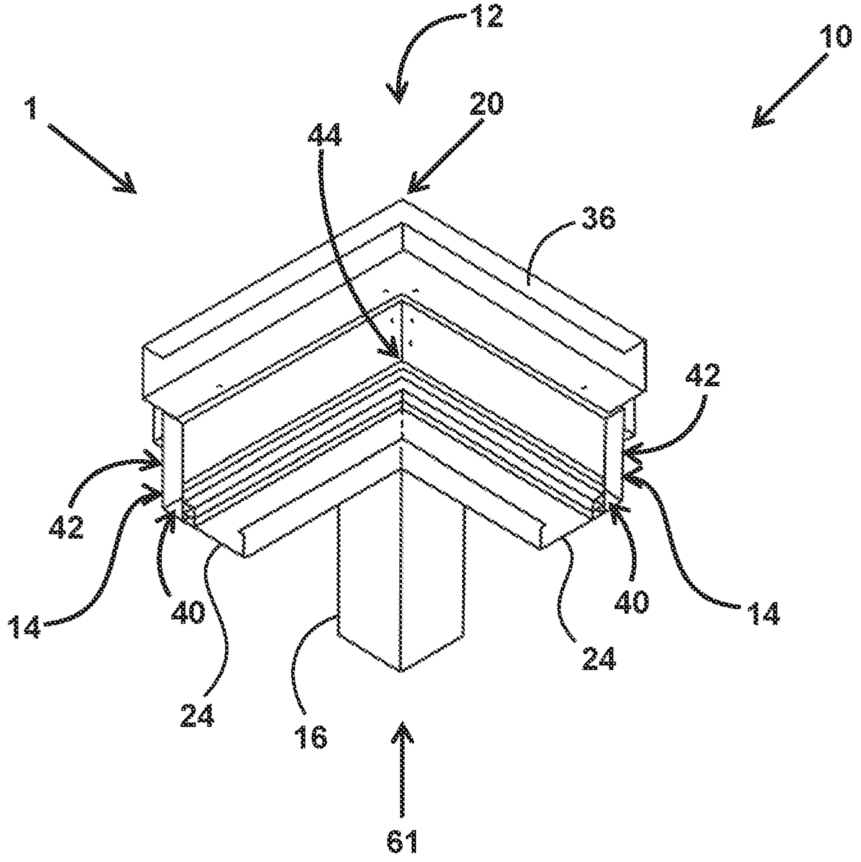
FIG. 4 illustrates an example of the structure of the patio cover and/or other components of the system, at or near the corners of a frame of the system, in accordance with one or more implementations.

Support beam couplers may be configured to couple (two) support beams 14 together. Support beam couplers may be located at or near the (upper) ends of support posts 16, opposite a ground or patio 13 surface, at or near the corners 20 of frame 12. FIG. 4 illustrates an example of the structure of patio cover 1 and/or other components of system 10, at or near the corners 20 of frame 12. In some implementations, support beams 14 may be coupled together by the support beam couplers, which may be directly coupled to support posts 16. In some implementations, the support beam couplers may be indirectly coupled to support posts 16 via other components. For example, support beam couplers may be coupled to support post 16 via various screws, nuts, bolts, clips, clamps, adhesive, and/or other coupling mechanisms; one or more corner brackets, and/or other components.

As shown in FIG. 4, support beams 14 may be hollow 40, or partially hollow (e.g., hollow ends), and have a rectangular cross section 42 and/or other cross sections. Support beams 14 may also have angled ends 44. An angled end 44 may comprise an end surface (or outline of a surface for hollow beams) of a support beam 14 that is not perpendicular to an elongated body (e.g., elongated along axis 19 or 21 shown in FIG. 3) of the support beam 14. The ends (e.g., at or near angled ends 44) of support beams 14 may be coupled to each other, a support beam coupler, a post 16, and/or other components of system 10 via screws, nuts, bolts, orifices in support beams 14, orifices in the pairs of tabs or plates, clips, clamps, and/or other coupling mechanisms. Angled ends 44 of the support beams 14 may face, meet, and/or abut each other when they are coupled together.

In some implementations, the support beams 14 conceal the support beam coupler (not visible in FIG. 4) when viewed from an area 61 within the louvered patio cover 1. By way of a non-limiting example, support beams 14 may be horizontally oriented and supported by the vertically oriented support post 16. In some implementations, a support beam coupler may be (indirectly) attached to a vertically oriented support post 16. In some implementations, the one or more support beam couplers may be located at corners of the frame 12 such that the assembled components form a clean, visually pleasing assembly. FIG. 4 also illustrates decorative cornices 36. Cornices 36 may enhance the visually pleasing assembly, for example, and/or have other purposes. Cornices 36 may have any shape and/or size that allows system 10 to function as described herein.

Returning to FIG. 1A, in some implementations, server 60 may be configured to communicate with one or more client computing platforms (e.g., user computing devices 54, actuator 22, light source 26, fan 28, precipitation sensor 30, etc.) according to client server architecture and/or other architectures. In some implementations, server 60, user computing devices 54, actuator 22, light source 26, fan 28, precipitation sensor 30, and/or other devices may be operatively linked via one or more electronic communication links. For example, such electronic communication links may be established, at least in part, via a network 50 such as the internet and/or other networks. It will be appreciated that this is not intended to be limiting, and that the scope of this disclosure includes implementations in which server 60, user computing devices 54, actuator 22, light source 26, fan 28, precipitation sensor 30, and/or other devices may be operatively linked via some other communication media. For example, the other communication media may include one or more of a cellular network, a data network, a local area network, a wide area network, a mesh network, a public switched telephone network, a private network, a satellite network, and/or other network suitable for communicating data.

Server 60 may include communication lines, or ports to enable the exchange of information with network 50 and/or other devices. Illustration of server 60 in FIG. 1A is not intended to be limiting. Server 60 may include a plurality of hardware, software, and/or firmware components operating together to provide the functionality attributed herein to server 60. For example, server 60 may be implemented by a cloud of computing platforms operating together as server 60. Server 60 may comprise one or more processors, electronic storage, and/or other components.

System 10 may include one or more processors 62. In some implementations, one or more processors 62 may be included in computing device 54, remote 52, server 60, actuator 22, light source 26, fan 28, precipitation sensor 30, and/or other components of system 10. One or more processors 62 may be configured to provide information processing capabilities in system 10. As such, one or more processors 62 may comprise one or more of a digital processor, an analog processor, a digital circuit designed to process information, an analog circuit designed to process information, a state machine, and/or other mechanisms for electronically processing information. In some implementations, one or more processors 62 may comprise a single processor, and/or may comprise a plurality of processing units. These processing units may be physically located within the same device (e.g., a user computing device 54), or the one or more processors may comprise processing functionality of a plurality of devices operating in coordination, or they may be a standalone component of system 10 (e.g., as shown in FIG. 1A).

In some implementations, one or more processors 62 may be configured to execute one or more computer program components. One or more processors 62 may be configured to execute the components by software; hardware; firmware; some combination of software, hardware, and/or firmware; and/or other mechanisms for configuring processing capabilities. The computer program components may be co-located within a single processing unit, or one or more of the components may be located remotely from the other components.

System 10 may include electronic storage 64. In some implementations, electronic storage 64 may be included in computing device 54, remote 52, server 60, actuator 22, light source 26, fan 28, precipitation sensor 30, and/or other components of system 10. In some implementations, electronic storage 64 may be a standalone component of system 10. Electronic storage 64 may comprise electronic storage media that electronically stores information. The electronic storage media may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). In some implementations, electronic storage 64 may be cloud based. Electronic storage 64 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 64 may store software algorithms, information determined by a processor in system 10, information received via user computing devices 54, and/or other information that enables system 10 to function properly. Electronic storage 64 may be (in whole or in part) a separate component within system 10 (e.g., as shown in FIG. 1A), or electronic storage 64 may be provided (in whole or in part) integrally with one or more other components of system 10 (e.g., computing device 54, server 60, etc.).

Figure 5:
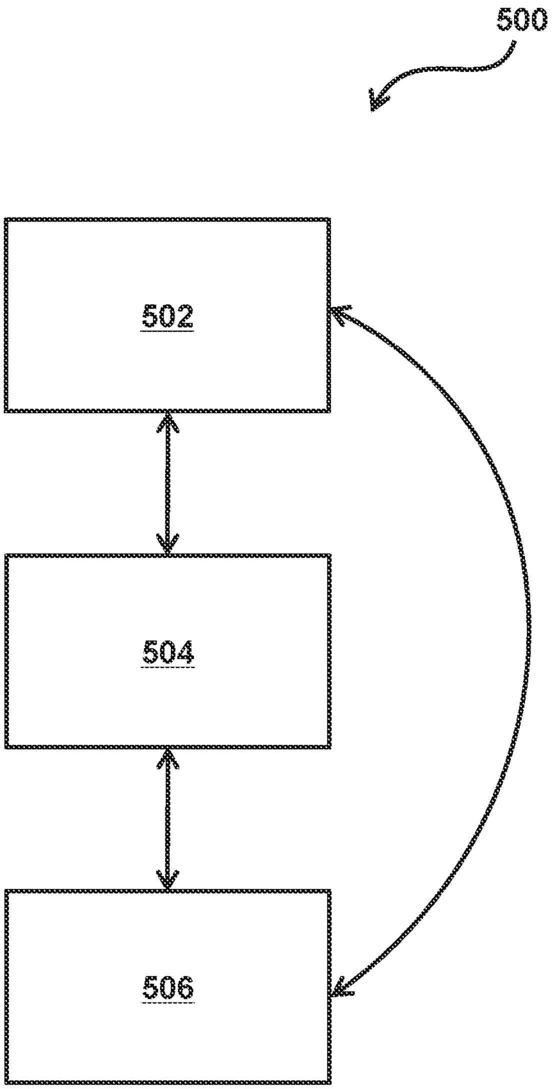
FIG. 5 illustrates a method for controlling a patio cover system, in accordance with one or more implementations.

FIG. 5 illustrates a method 500 for controlling a patio cover system. The system comprises a frame comprising support beams, support posts configured to support the frame, cover panels rotatably coupled to the support beams, an actuator mounted to the frame and coupled to the cover panels, a gutter coupled to the frame, a light source coupled to the gutter, a fan, a portable controller wirelessly coupled to the actuator and the light source, and/or other components. The actuator may be configured to rotate the cover panels between an open configuration and a closed configuration. The light source may be configured to light an area under the cover panels. The operations of method 500 presented below are intended to be illustrative. In some implementations, method 500 may be accomplished with one or more additional operations not described, and/or without one or more of the operations discussed. Additionally, the order in which the operations of method 500 are illustrated in FIG. 5 and described below is not intended to be limiting.

In some implementations, one or more portions of method 500 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At an operation 502, the actuator may be remotely controlled, with the portable controller, to rotate the cover panels between the open configuration and the closed configuration. Controlling the actuator to rotate the cover panels between the open configuration and the closed configuration may comprise one or more of (1) turning the actuator on or off, (2) causing the actuator to rotate the cover panels between the open configuration and the closed configuration, (3) causing the actuator to stop rotation of the cover panels at an intermediate configuration between the open configuration and the closed configuration, and/or other operations. In some implementations, operation 502 may be performed by a portable controller the same as or similar to portable controller 32 and an actuator the same as or similar to actuator 22 (shown in FIGS. 1A and/or 1B, and described herein).

At an operation 504, the light source may be remotely controlled, with the portable controller, to light the area under the cover panels. Controlling the light source to light the area under the cover panels may comprise one or more of (1) turning the light source on or off, (2) adjusting an intensity of light produced by the light source, (3) adjusting a color of the light produced by the light source, and/or other operations. In some implementations, operation 504 may be performed by a portable controller the same as or similar to portable controller 32 and a light source the same as or similar to light source 26 (shown in FIGS. 1A and/or 1B and described herein).

At an operation 506, the fan may be remotely controlled, with the portable controller, to fan the area under the cover panels. In some implementations, operation 506 may be performed by a portable controller the same as or similar to portable controller 32 and a fan the same as or similar to fan 28 (shown in FIG. 1A and described herein).

In some implementations, the portable controller may comprise an electronic application executed by a computing device associated with a user. The computing device may be a smart phone or a tablet computer, for example.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A patio cover control system comprising:

a frame comprising support beams;

a gutter coupled to interior surfaces of the support beams, the gutter comprising two lighting channels each configured to, by itself, receive and retain a light source above a ground surface, with a first of the two lighting channels configured to open toward an interior of the gutter and a second of the two lighting channels opening toward the ground surface;

support posts configured to support the frame;

cover panels rotatably coupled to the support beams;

an actuator mounted to the frame and coupled to the cover panels, the actuator configured to rotate the cover panels between an open configuration and a closed configuration; and a portable controller wirelessly coupled to the actuator, the portable controller configured to:

control the actuator to rotate the cover panels between the open configuration and the closed configuration; and control at least one other electrical component of the patio cover system.

2. The system of claim 1, wherein the cover panels are louvered.

3. The system of claim 1, wherein the portable controller is hand held.

4. The system of claim 1, wherein the portable controller is a remote control.

5. The system of claim 1, wherein the portable controller comprises an electronic application executed by a computing device associated with a user.

6. The system of claim 5, wherein the computing device is a smart phone or a tablet computer.

7. The system of claim 1, further comprising one or more light sources configured to be received and retained by the first lighting channel and/or the second lighting channel;

wherein the at least one other electrical component of the patio cover system comprises the one or more light sources, the one or more light sources configured to light an area under the cover panels, and wherein controlling the one or more light sources to light the area under the cover panels comprises one or more of (1) turning the one or more light sources on or off, (2) adjusting an intensity of light produced by the one or more light sources, and (3) adjusting a color of the light produced by the one or more light sources.

8. The system of claim 1, wherein controlling the actuator to rotate the cover panels between the open configuration and the closed configuration comprises one or more of (1) turning the actuator on or off, (2) causing the actuator to rotate the cover panels between the open configuration and the closed configuration, and (3) causing the actuator to stop rotation of the cover panels at an intermediate configuration between the open configuration and the closed configuration.

9. The system of claim 1, wherein the at least one other electrical component of the patio cover system comprises a precipitation sensor operatively coupled to the actuator and the portable controller, the precipitation sensor configured to generate output signals indicating a presence of precipitation on the frame and/or the cover panels.

10. The system of claim 9, wherein the actuator is configured to, responsive to the output signals indicating the presence of precipitation, rotate the cover panels to the closed configuration.

11. The system of claim 10, wherein the precipitation sensor is configured to generate output signals indicating the presence of precipitation responsive to a quantity of precipitation breaching a threshold precipitation level.

12. The system of claim 11, wherein the portable controller is configured to receive entry or selection of the threshold precipitation level from a user.

13. The system of claim 9, wherein the actuator is configured to, responsive to the output signals indicating a lack of precipitation, or a ceasing of precipitation, rotate the cover panels to the open configuration, or an intermediate configuration between the closed configuration and the open configuration.

14. The system of claim 1, wherein the at least one other electrical component of the patio cover system comprises a fan mounted to the frame or a support post, the fan being operatively coupled to the portable controller.

15. The system of claim 14, where the portable controller is configured to control a speed and/or direction of fan rotation.

16. A method for controlling a patio cover system; the patio cover system comprising:

a frame comprising support beams;

a gutter coupled to interior surfaces of the support beams, the gutter comprising two lighting channels each configured to, by itself, receive and retain a light source above a ground surface, with a first of the two lighting channels configured to open toward an interior of the gutter and a second of the two lighting channels opening toward the ground surface;

support posts configured to support the frame;

cover panels rotatably coupled to the support beams;

an actuator mounted to the frame and coupled to the cover panels, the actuator configured to rotate the cover panels between an open configuration and a closed configuration; and a portable controller wirelessly coupled to the actuator;

the method comprising:

remotely controlling, with the portable controller, the actuator to rotate the cover panels between the open configuration and the closed configuration; and remotely controlling, with the portable controller, at least one other electrical component of the patio cover system.

17. The method of claim 16, wherein the portable controller comprises an electronic application executed by a computing device associated with a user.

18. The method of claim 17, wherein the computing device is a smart phone or a tablet computer.

19. The method of claim 16, wherein the at least one other electrical component of the patio cover system comprises one or more light sources configured to be received and retained by the first lighting channel and/or the second lighting channel, the one or more light sources configured to light an area under the cover panels, and wherein controlling the one or more light sources to light the area under the cover panels comprises one or more of (1) turning the one or more light sources on or off, (2) adjusting an intensity of light produced by the one or more light sources, and (3) adjusting a color of the light produced by the one or more light sources.

20. The method of claim 16, wherein controlling the actuator to rotate the cover panels between the open configuration and the closed configuration comprises one or more of (1) turning the actuator on or off, (2) causing the actuator to rotate the cover panels between the open configuration and the closed configuration, and (3) causing the actuator to stop rotation of the cover panels at an intermediate configuration between the open configuration and the closed configuration.

* * * * *